US008424941B2

(12) United States Patent
Ihrke et al.

(10) Patent No.: US 8,424,941 B2
(45) Date of Patent: Apr. 23, 2013

(54) ROBOTIC THUMB ASSEMBLY

(75) Inventors: Chris A. Ihrke, Hartland, MI (US);
Lyndon Bridgwater, Houston, TX (US);
Robert Platt, Houston, TX (US);
Charles W. Wampler, II, Birmingham, MI (US); S. Michael Goza, League City, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 531 days.

(21) Appl. No.: 12/564,085

(22) Filed: Sep. 22, 2009

(65) Prior Publication Data
US 2011/0067520 A1 Mar. 24, 2011

(51) Int. Cl.
*B25J 15/10* (2006.01)
*B25J 17/00* (2006.01)

(52) U.S. Cl.
USPC .............................. 294/106; 901/28

(58) Field of Classification Search ............. 294/106, 294/111; 414/5, 7; 623/24, 57, 64; 901/21, 901/27, 28; 74/490.04, 490.05, 490.06
See application file for complete search history.

(56) References Cited

U.S. PATENT DOCUMENTS

| 4,865,376 A * | 9/1989 | Leaver et al. | 294/111 |
|---|---|---|---|
| 4,921,293 A * | 5/1990 | Ruoff et al. | 294/111 |
| 4,946,380 A * | 8/1990 | Lee | 623/24 |
| 5,080,682 A * | 1/1992 | Schectman | 623/64 |
| 5,159,268 A | 10/1992 | Wu | |
| 5,200,679 A * | 4/1993 | Graham | 318/568.16 |
| 5,447,403 A * | 9/1995 | Engler, Jr. | 414/4 |
| 5,570,920 A * | 11/1996 | Crisman et al. | 294/111 |
| 6,244,644 B1 | 6/2001 | Lovchik et al. | |
| 7,407,208 B2 | 8/2008 | Tadano | |
| 2001/0028174 A1* | 10/2001 | Matsuda et al. | 294/106 |
| 2006/0158146 A1 | 7/2006 | Tadano | |
| 2007/0236162 A1 | 10/2007 | Kawabuchi et al. | |
| 2009/0015026 A1* | 1/2009 | Matsuda et al. | 294/106 |

FOREIGN PATENT DOCUMENTS

| EP | 1829650 A1 | 9/2007 |
|---|---|---|
| JP | 63103990 U | 7/1988 |
| JP | 2003117873 A | 4/2003 |
| JP | 2004090193 A | 3/2004 |

OTHER PUBLICATIONS http://robotics.nasa.gov/courses/fall2002/event/oct1/NASA_Robotics_20021001.htm.

* cited by examiner

*Primary Examiner* — Paul T Chin
(74) *Attorney, Agent, or Firm* — Quinn Law Group, PLLC

(57) ABSTRACT

An improved robotic thumb for a robotic hand assembly is provided. According to one aspect of the disclosure, improved tendon routing in the robotic thumb provides control of four degrees of freedom with only five tendons. According to another aspect of the disclosure, one of the five degrees of freedom of a human thumb is replaced in the robotic thumb with a permanent twist in the shape of a phalange. According to yet another aspect of the disclosure, a position sensor includes a magnet having two portions shaped as circle segments with different center points. The magnet provides a linearized output from a Hall effect sensor.

16 Claims, 7 Drawing Sheets

ROBOTIC THUMB ASSEMBLY

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to robotic hands, and more particularly to robotic thumbs.

BACKGROUND OF THE INVENTION

Typical robots are automated devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well as control over the applied torque or force, motion, and the various grasp types.

SUMMARY OF THE INVENTION

According to a first aspect of the disclosure, a robotic hand assembly includes a base structure, first, second, third, and fourth phalanges, and first, second, third, and fourth joints. The first joint operatively connects the first phalange to the base structure such that the first phalange is selectively rotatable with respect to the base structure about a first axis. The second joint operatively connects the second phalange to the first phalange such that the second phalange is selectively rotatable with respect to the first phalange about a second axis. The third joint operatively connects the third phalange to the second phalange such that the third phalange is selectively rotatable with respect to the second phalange about a third axis. The fourth joint operatively connects the fourth phalange to the third phalange such that the fourth phalange is selectively rotatable with respect to the third phalange about a fourth axis.

Five tendons are operatively connected to the phalanges to selectively exert force thereon and thereby generate torque at the joints. The tendons are configured such that the torque at each of the first, second, third, and fourth joints is independently controllable by the five tendons.

According to a second aspect of the disclosure, a robotic hand assembly includes a robotic thumb including a first phalange and a second phalange, and a joint interconnecting the first phalange and the second phalange such that the first phalange is selectively rotatable with respect to the second phalange. A magnet is mounted with respect to the first phalange and has a first portion forming a first circle segment characterized by a first center point, and has a second portion forming a second circle segment characterized by a second center point. A Hall effect sensor is mounted with respect to the second phalange for rotation therewith with respect to the first phalange. The shape of the magnet provides linearized output of the Hall effect sensor, thereby providing accurate positional data to a control system for the robotic hand.

According to a third aspect of the invention, a robotic hand assembly includes a base structure, first, second, third, and fourth phalanges, and first, second, third, and fourth joints. The first joint operatively connects the first phalange to the base structure such that the first phalange is selectively rotatable with respect to the base structure about a first axis. The second joint operatively connects the second phalange to the first phalange such that the second phalange is selectively rotatable with respect to the first phalange about a second axis. The third joint operatively connects the third phalange to the second phalange such that the third phalange is selectively rotatable with respect to the second phalange about a third axis. The fourth joint operatively connects the fourth phalange to the third phalange such that the fourth phalange is selectively rotatable with respect to the third phalange about a fourth axis. The third and fourth axes are substantially parallel to one another. The second phalange is characterized by a twist such that the second axis is not parallel to the third and fourth axes. The twist replaces one of the five degrees of freedom of a human hand with the twist in the shape of the second phalange.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
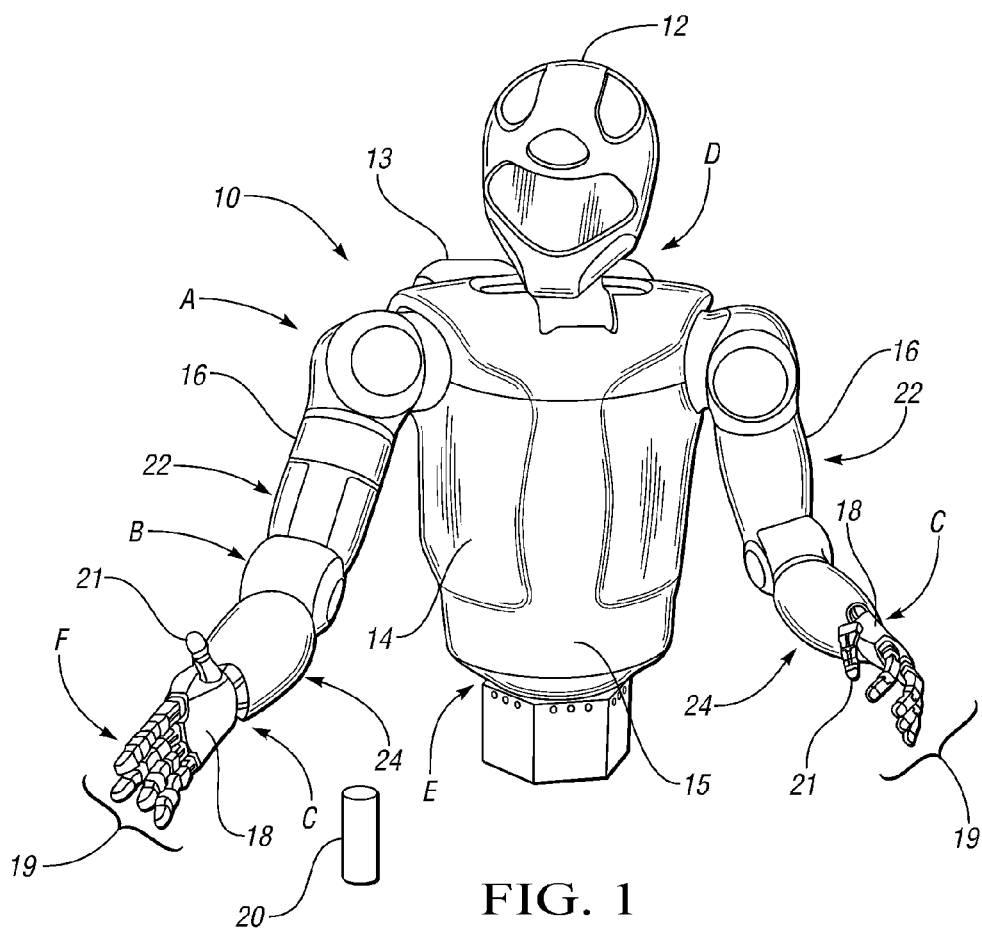
FIG. 1 is a schematic perspective illustration of a dexterous humanoid robot having two hands.

With reference to the drawings, wherein like reference numbers refer to the same or similar components throughout the several views, FIG. 1 shows a dexterous humanoid robot 10 adapted to perform one or more tasks with multiple degrees of freedom (DOF).

The humanoid robot 10 may include a head 12, torso 14, waist 15, arms 16, hands 18, fingers 19, and thumbs 21, with various joints being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply.

According to one embodiment, the robot 10 is configured with a plurality of independently and interdependently-moveable robotic joints, such as but not limited to a shoulder joint assembly (arrow A), an elbow joint assembly (arrow B), a wrist joint assembly (arrow C), a neck joint assembly (arrow D), and a waist joint assembly (arrow E), as well as the various finger and thumb joint assemblies (arrow F) positioned between the phalanges of each robotic finger 19 and thumb 21.

The arm 16 is divided into an upper arm 22 and a lower arm (or forearm) 24. The upper arm 22 extends from the shoulder joint assembly (arrow A) to the elbow joint assembly (arrow B). Extending from the elbow joint (arrow B) is the lower arm 24, hands 18, fingers 19, and thumbs 21. For the purpose of simplification, as described herein, the upward direction is toward the head 12 and the downward direction is toward the waist 15. Those skilled in the art will appreciate that since the robot 10 is intended to simulate a humanoid, the robot will be substantially symmetrical about a vertical plane bisecting the torso and head, and essentially include an identical symmetrical structure on both the left and right sides.

Figure 2:
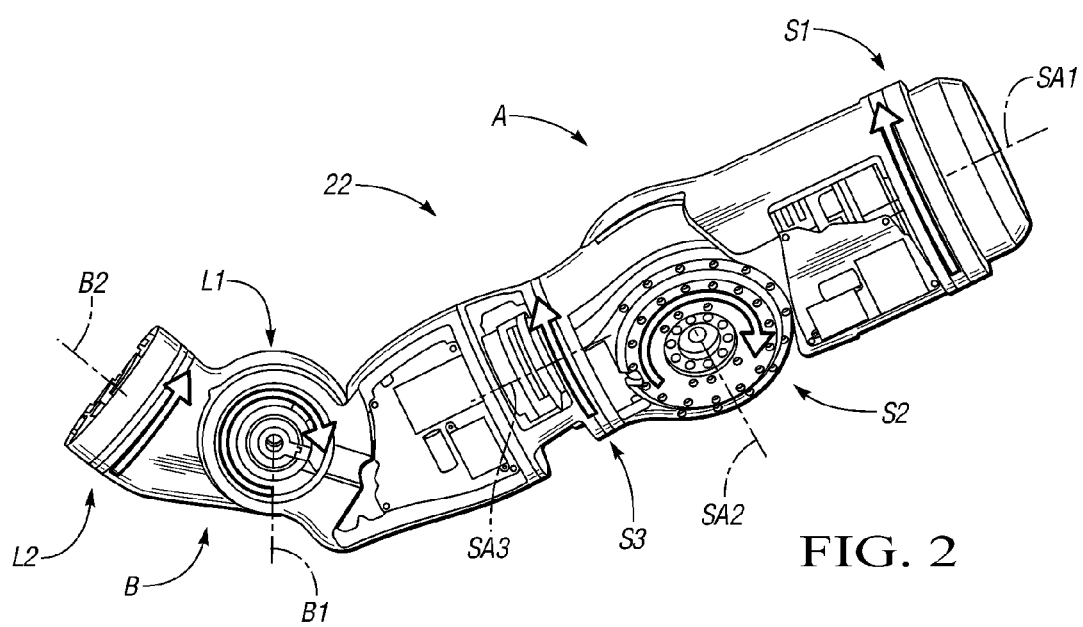
FIG. 2 is schematic perspective illustration of an upper arm for the dexterous humanoid robot of FIG. 1.

Referring to FIG. 2, the upper arm 22 is illustrated. Although only one upper arm 22 for the arms 16 is shown, both the left and the right arms 16 operate in the same manner as described below. The upper arm 22 has a shoulder joint assembly (arrow A) that includes a first shoulder joint S1 providing a first DOF, and second shoulder joint S2 providing a second DOF, and a third shoulder joint S3 providing a third degree of freedom. Together the first through third shoulder joints S1, S2, S3 perform the movements that represent the movements a human shoulder can perform. Specifically, rotation of the first shoulder joint S1 about a first shoulder axis SA1 moves a second shoulder axis SA2 for the second shoulder joint S2 into a desired position. Based upon the position of the first shoulder joint S1, rotation of the second shoulder joint S2 about the second shoulder axis SA2 then moves the arm 16 up and down relative to the torso 14, or forward and backward relative to the torso 14. The third shoulder joint S3 rotates the upper arm 22 about a third shoulder axis SA3. Rotation of the third shoulder joint S3 rotates the upper arm 22 axially, i.e. rotation of the third shoulder joint S3 rotates the elbow joint assembly (arrow B) to face upwards or downwards. Therefore, together the first shoulder joint S1, the second shoulder joint S2, and the third shoulder joint S3 form the motions of a shoulder joint assembly (arrow A).

The upper arm 22 also includes an elbow joint assembly (arrow B) which includes a first elbow joint L1 and a second elbow joint L2. The first elbow joint L1 and second elbow joint L2 each provide a degree of freedom. Together the first elbow joint L1, and the second elbow joint L2 perform the movements that represent the movements a human elbow can perform. Rotation of the first elbow joint L1 about a first elbow axis B1 causes the upper arm 22, below the elbow joint assembly (arrow B) to bend and straighten. Additionally, rotation of the second elbow joint L2 about a second elbow axis B2 causes the upper arm 22, below the elbow joint assembly (arrow B) to rotate axially, i.e. rotation of the second elbow joint L2 about the second elbow axis B2 rotates the lower arm 24 and hand 18 (FIG. 1) to face palm up or down.

Figure 3:
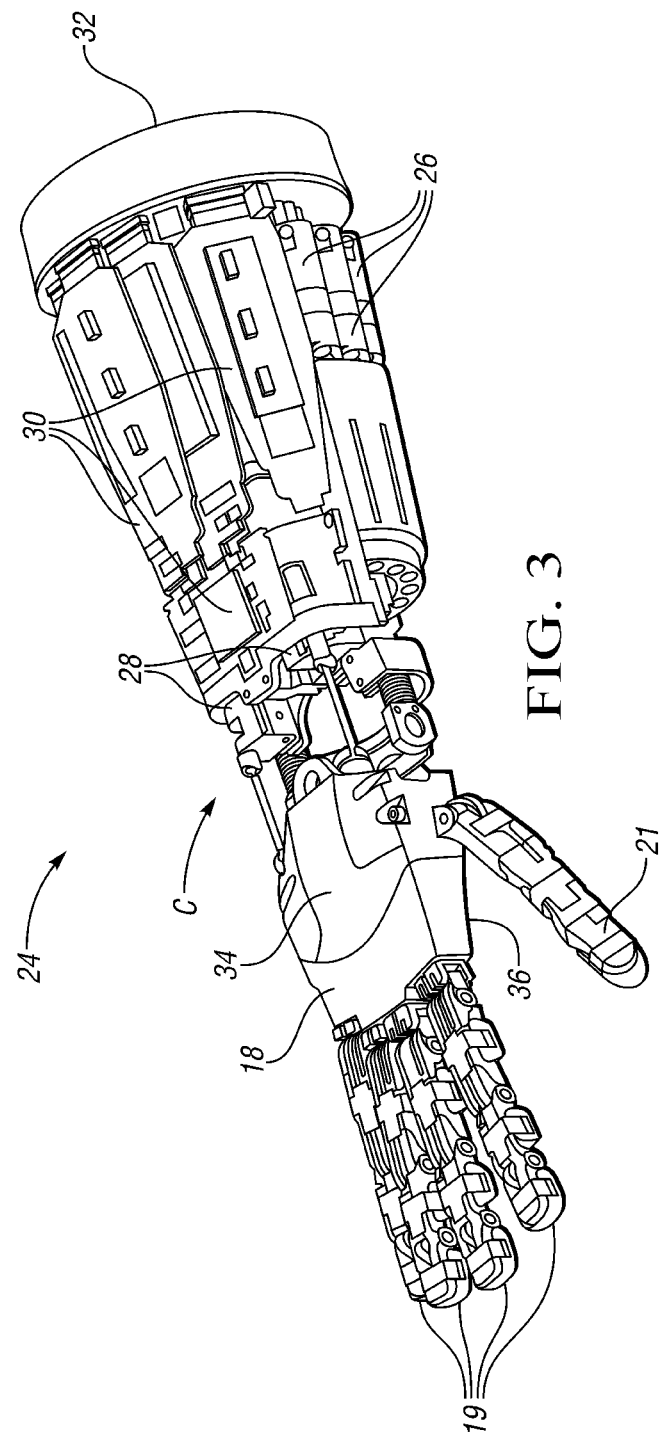
FIG. 3 is schematic perspective illustration of a lower arm for the dexterous humanoid robot of FIGS. 1 and 2.

FIG. 3 illustrates the lower arm 24, including the wrist joint assembly (arrow C), the hand 18, the fingers 19, and thumb 21. The lower arm 24 includes a plurality of finger (and thumb) actuators 26 and a plurality of wrist actuators 28. Additionally, a plurality of controls 30 for the finger actuators 26 and the wrist actuators 28 are also supported on the lower arm 24. The lower arm 24 is attached to a load cell 32 which is used to connect the lower arm 24 with the upper arm 22. The hand 18 includes a base structure 34 that defines the palm 36 of the hand 18. Fingers 19 and thumb 21 are movably mounted to the palm structure 34 and selectively curl toward the palm 36 in order to grip an object, such as the one shown at 20 in FIG. 1.

In the embodiment depicted, the thumb 21 is proportionately incorporated into a hand 18 that is comparable in size to that of a sixtieth to eight-fifth percentile human male hand. More specifically, in the embodiment depicted, the length of the hand 18 is 7.9 inches (eightieth percentile human); the breadth, or width, of the hand 18 is 3.6 inches (sixtieth percentile human); and the circumference of the hand (around the base structure) is 8.8 inches (eighty-fifth percentile human).

Figure 4:
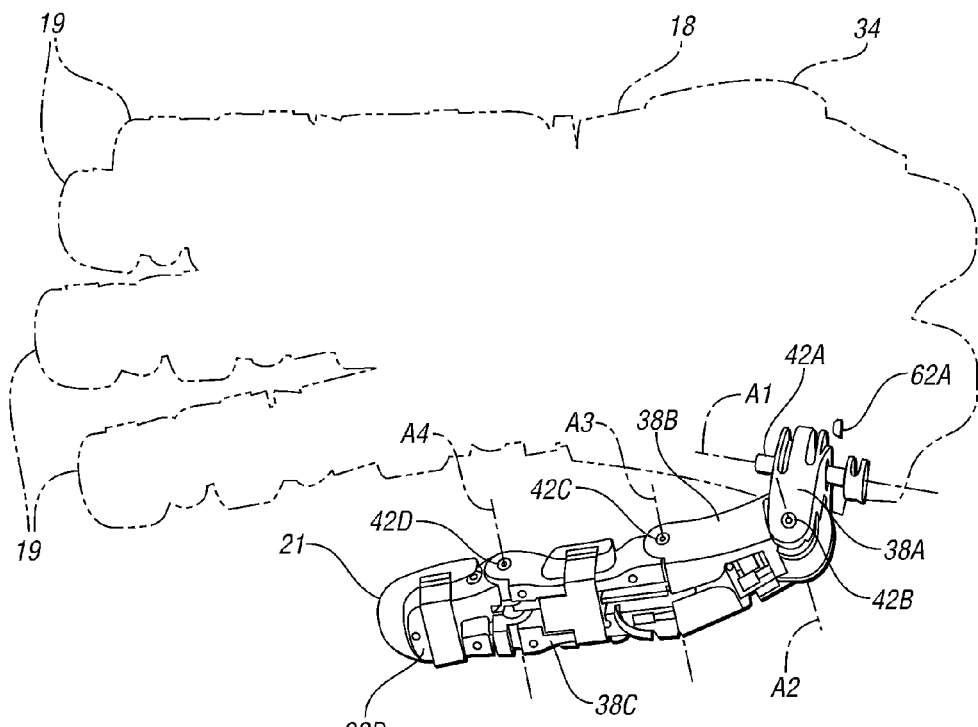
FIG. 4 is a schematic, top view of one of the hands of FIG. 1.
Figure 5:
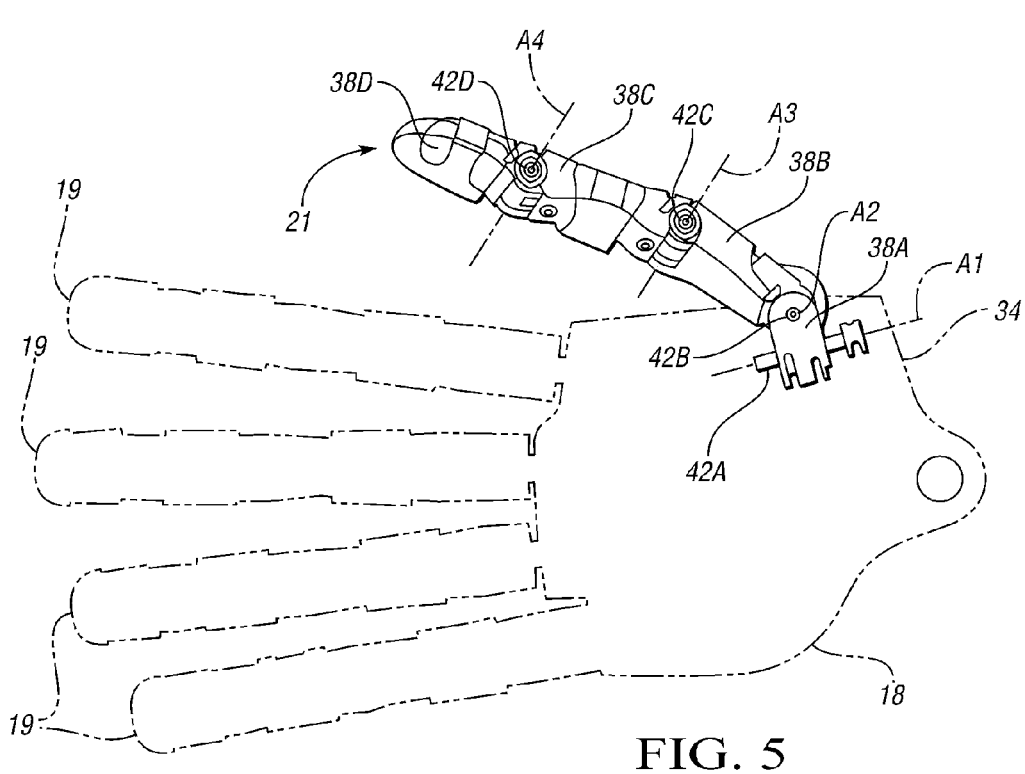
FIG. 5 is a schematic, bottom view of the hand of FIG. 4.

Referring to FIGS. 4 and 5, the thumb 21 includes a plurality of rigid links, or phalanges 38A-D, and a plurality of joints 42A-D. Joint 42A rotatably mounts phalange 38A to the base structure 34 such that the phalange 38A is selectively rotatable with respect to the structure 34 about axis A1. Joint 42B rotatably mounts phalange 38B to phalange 38A such that phalange 38B is selectively rotatable with respect to phalange 38A about axis A2. Joint 42C rotatably mounts phalange 38C to phalange 38B such that phalange 38C is selectively rotatable with respect to phalange 38B about axis A3 Joint 42D rotatably mounts phalange 38D to phalange 38C such that phalange 38D is selectively rotatable with respect to phalange 38C about axis A4.

The thumb 21, with four phalanges 38A-38D and four independently controllable joints 42A-42D, is therefore characterized by four degrees of freedom. A human thumb is most accurately modeled to have five independently controllable joints or degrees of freedom. The thumb 21 in the embodiment depicted is configured to closely approximate the poses achievable by a human thumb with only four degrees of freedom, thereby contributing to the compactness of the hand 18.

Figure 7:
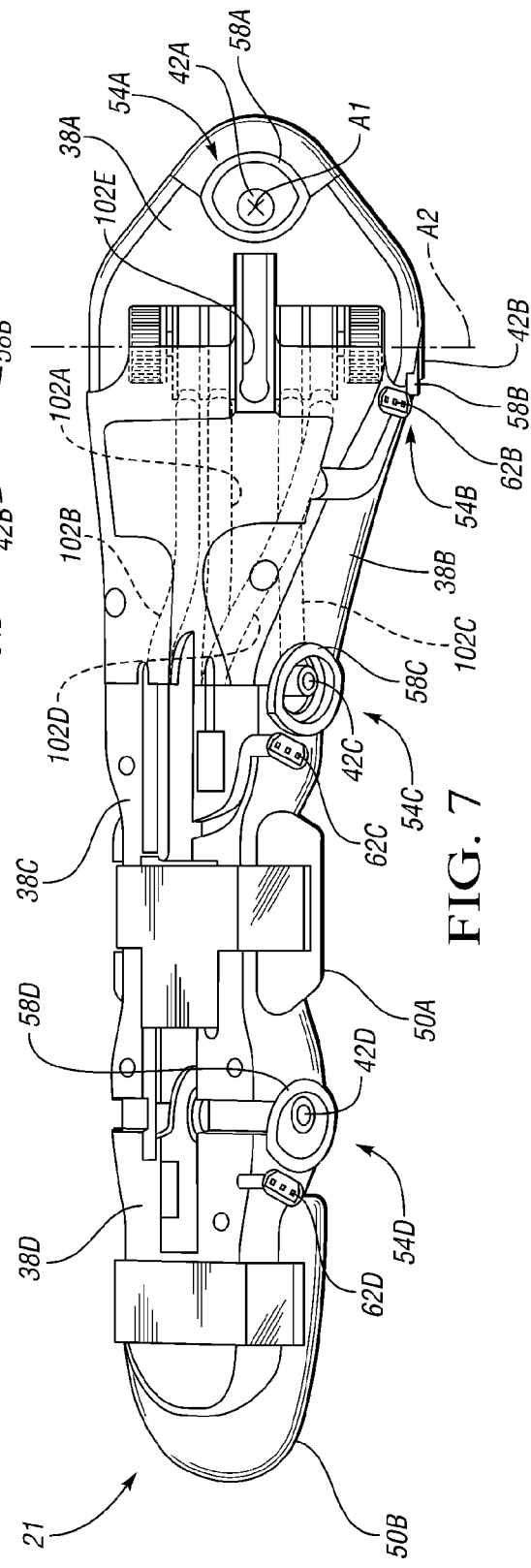
FIG. 7 is another schematic, perspective view of a thumb of the hand of FIGS. 4 and 5.

More specifically, one of the five degrees of freedom in the human thumb, namely, the dynamic twist between axes A2 and A3, has been replaced in the robotic thumb 21 with a permanent, angular twist formed in the shape of phalange 38B. That is, phalange 38B is configured and shaped such that axis A3 is linearly displaced and rotated approximately 40 degrees relative to axis A2. Axes A4 and A3 are parallel to one another. As shown in FIGS. 5 and 7, axes A1 and A2 do not intersect, but axis A2 extends in directions that are orthogonal to the directions in which axis A1 extends. Axis A2 is neither parallel nor perpendicular to axes A3 and A4.

Figure 6:
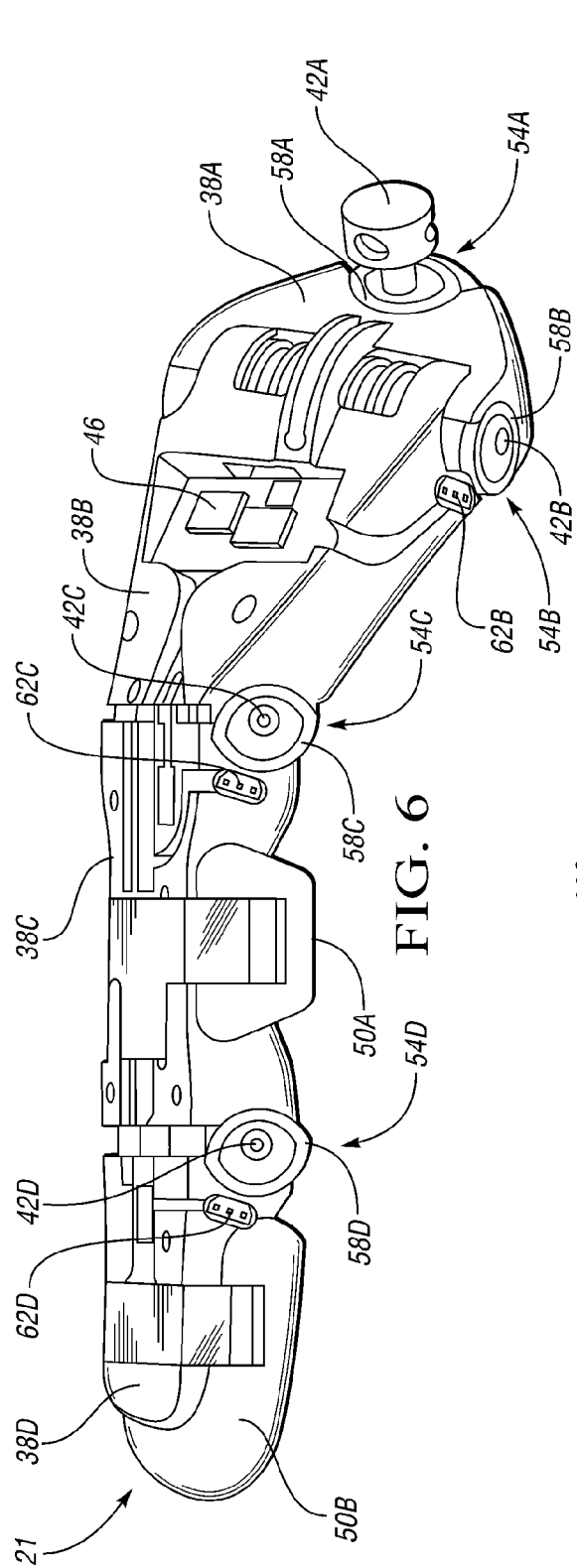
FIG. 6 is a schematic, perspective view of a thumb of the hand of FIGS. 4 and 5.
Figure 8:
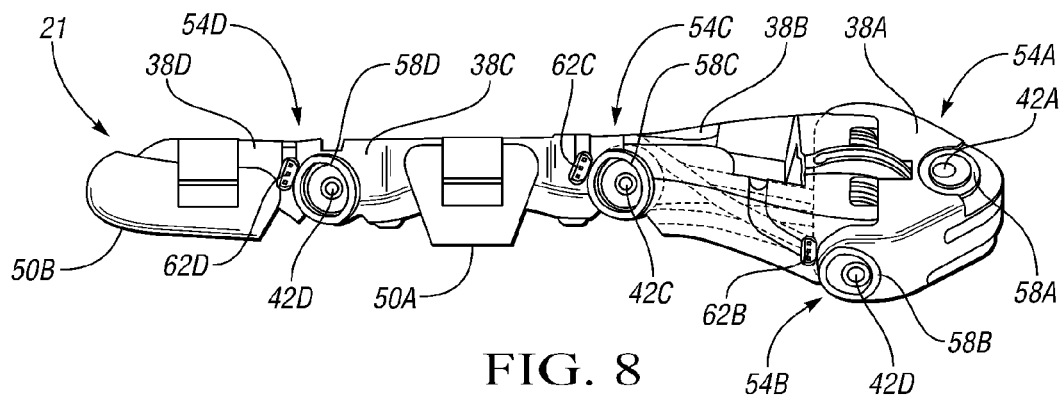
FIG. 8 is yet another schematic, perspective view of a thumb of the hand of FIGS. 4 and 5.

Referring to FIGS. 6-8, the thumb 21 includes at least two types of sensors, along with compact electronics 46 to read the sensors and transmit sensor data upstream. The functions of the electronics 46 include providing power to the sensors, collecting analog sensor data, converting analog signals to digital signals, multiplexing digital signals, and communicating data to upstream electronics. More specifically, the sensors of the thumb 21 includes tactile load cells 50A, 50B, each of which is mounted to a respective phalange 38C, 38D. The thumb 21 also includes a plurality of joint position sensor assemblies 54A-54D, each of which is configured to measure the absolute angular position of a respective one of the joints 42A-42D and the angular position of a phalange relative to a connecting phalange.

Figure 9:
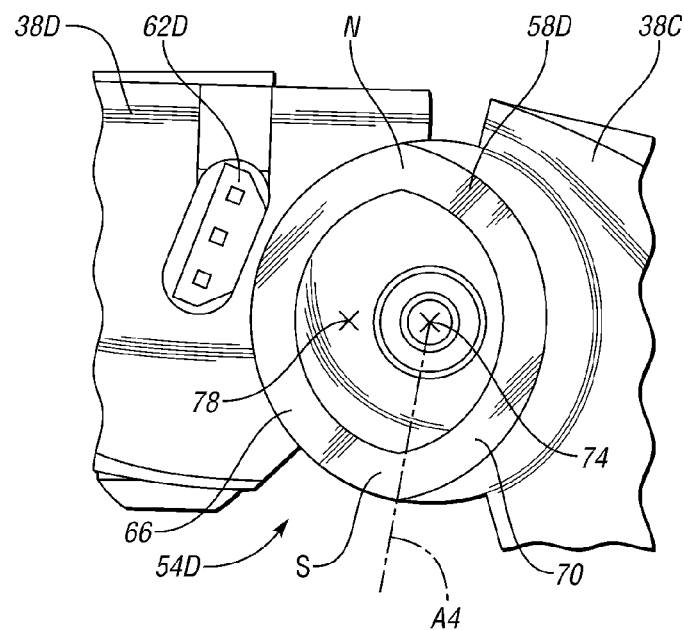
FIG. 9 is a schematic, side view of a sensor assembly at a joint of the thumb of FIGS. 6-8.

Each of the joint position sensor assemblies 54A-54D includes a respective magnet 58A-58D and a respective Hall effect sensor 62A-62D (Hall effect sensor 62A is shown in FIG. 4). Referring to FIG. 9, sensor assembly 54D is representative of sensor assemblies 54A-54C, and thus magnet 58D and sensor 62D are representative of magnets 58A-58C and sensors 62A-62C, respectively. Magnet 58D is rigidly mounted with respect to phalange 38C, and sensor 62D is rigidly mounted with respect to phalange 38D. Magnet 58D is characterized by two portions 66, 70. Portion 66 is a segment of a circle having a center point 74 on axis A4. Portion 70 is a segment of a circle having a center point at 78. The north pole N of the magnet 58D is disposed at one intersection of the portions 66, 70, and the south pole S of the magnet 58D is disposed at the other intersection of the portions 66, 70. In the embodiment depicted, portion 66 has the same radius as portion 70, and the concave sides of portions 66, 70 face one another. The magnet 54D circumscribes both center points 74, 78.

Figure 10:
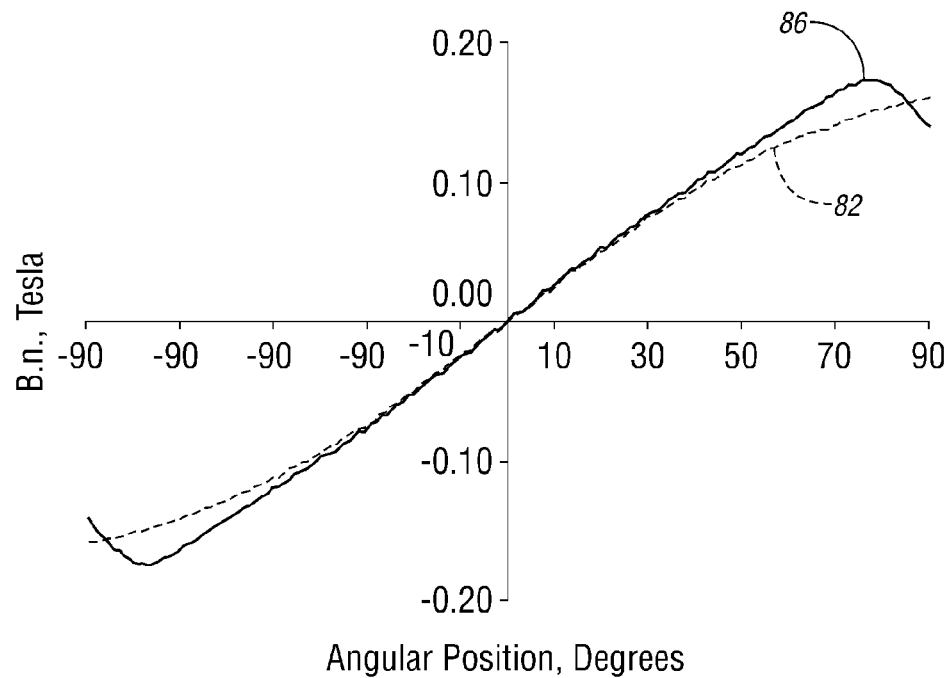
FIG. 10 is a graph depicting the performance of the sensor assembly of FIG. 9 as a function of the rotational position of the joint.

Sensor 62D is positioned on phalange 38D such that, as phalange 38D rotates with respect to phalange 38C about axis A4, the sensor 62D maintains a constant distance from portion 66 of the magnet 58D. The shape of the magnet 58D and the placement of the sensor 62D provide a linear relationship between angular position of the phalange 38D with respect to phalange 38C and the change in magnetic field that is read by sensor 62D. More specifically, and with reference to FIG. 10, line 82 depicts the signal generated by a Hall effect sensor as a function of angular position with respect to a conventional round magnet (not shown). As shown by line 82, the signal is sinusoidal. Line 86 depicts the signal generated by Hall effect sensor 62D as a function of angular position with respect to magnet 58D. As shown by line 86, sensor assembly 54D generates an approximately linear signal over a 150-degree usable range of angular positions.

Magnet 58A is mounted with respect to phalange 38A and sensor 62A is mounted with respect to the base structure 34, and thus sensor assembly 54A measures the rotational position of phalange 38A with respect to the base structure 34. Magnet 58B is mounted with respect to phalange 38A and sensor 62B is mounted with respect to phalange 38B, and thus sensor assembly 54B measures the rotational position of phalange 38B with respect to phalange 38A. Magnet 58C is mounted with respect to phalange 38B and sensor 62C is mounted with respect to phalange 38C, and thus sensor assembly 54C measures the rotational position of phalange 38C with respect to phalange 38B. Magnet 58D is mounted with respect to phalange 38C and sensor 62D is mounted with respect to phalange 38D, and thus sensor assembly 54D measures the rotational position of phalange 38D with respect to phalange 38C.

Figure 11:
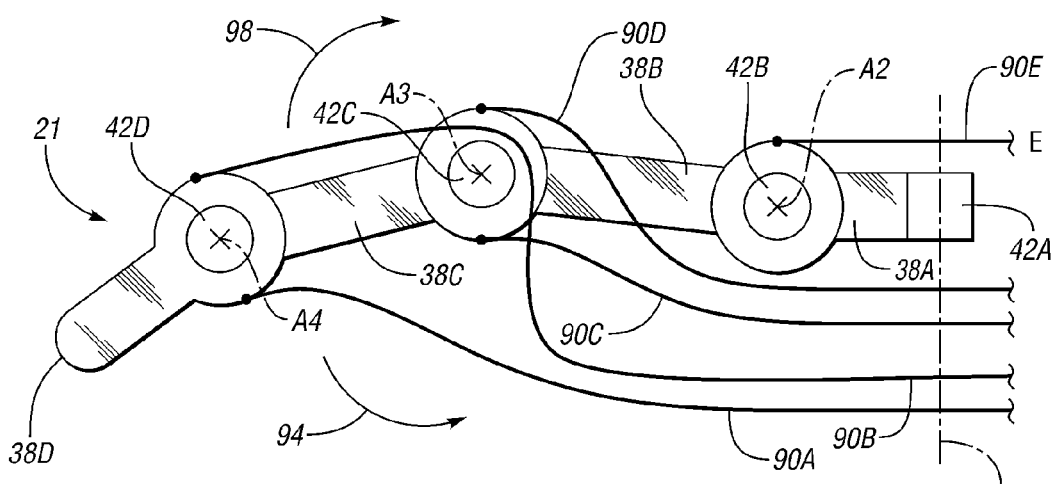
FIG. 11 is a schematic, side view of the thumb of FIGS. 6-8 depicting tendon routing.

Referring to FIG. 11, wherein like reference numbers refer to like components from FIGS. 1-10, movement of the phalanges 38A-38D about joints 42A-42D is accomplished by robotic tendons 90A-90E, i.e., flexible members such as cables. Each of the tendons 90A-90E is operatively connected to a respective actuator (shown at 26 in FIG. 3) in the forearm (shown at 24 in FIG. 3). In an exemplary embodiment, the actuators 26 are electric motors operatively connected to the tendons 90A-90E by drive mechanisms configured to convert the rotary motion of the motors to linear motion to drive the tendons 90A-90E. The placement of the actuators and drive mechanisms in the forearm 24 and/or wrist contributes to the compactness of the hand 18.

The routing of the tendons 90A-90E with respect to the joints 42A-D and the axes A1-A4 enables the thumb 21 to be fully controlled through four degrees of freedom using only the five tendons 90A-90E. Two opposing tendons 90A, 90B control the distal pitch joint 42D, and two opposing tendons 90C, 90D control the medial pitch joint 42C. One end of tendon 90A is operatively connected to phalange 38D on one side of joint 42D and axis A4 such that tension in tendon 90A causes rotation of phalange 38D with respect to phalange 38C about axis A4 in a first direction 94. One end of tendon 90B is operatively connected to phalange 38D on the opposite side of joint 42D and axis A4 from tendon 90A such that tension in tendon 90B causes rotation of phalange 38D with respect to phalange 38C about axis A4 in a second direction 98 opposite the first direction 94.

One end of tendon 90C is operatively connected to phalange 38C on one side of joint 42C and axis A3 such that tension in tendon 90C causes rotation of phalange 38C with respect to phalange 38B about axis A3 in the first direction 94. One end of tendon 90D is operatively connected to phalange 38C on the opposite side of joint 42C and axis A3 from tendon 90C such that tension in tendon 90D causes rotation of phalange 38C with respect to phalange 38B about axis A3 in the second direction 98. Rotation of the phalanges in the first direction 94 causes the phalanges to rotate toward the palm 36, and thus rotation of the phalanges in the first direction 94 enables the hand 18 to grip an object. Rotation of the phalanges in the second direction 98 causes the phalanges to rotate away from the palm 36, and thus causes the thumb 21 to release a grip on the object.

Tendon 90A is routed on the palmar side of joints 42B-D and axes A2-A4. Tendon 90B is on the palmar side of joint 42B and axis A2, and is on the non-palmar side of joints 42C and 42D and axes A3 and A4. Tendon 90C is routed on the palmar side of joints 42B and 42C axes A2 and A3. Tendon 90D is routed on the palmar side joint 42B and axis A2. Tendon 90E is routed on the non-palmar side of axis A2.

The routing of tendons 90A-90D on the palmar side of the axis A2 of the proximal pitch joint 42B enables tendons 90A-90D to be used to close joint 42B, i.e., to rotate phalange 38B with respect to phalange 38A about axis A2. The tension in each of these tendons 90A-90D is summed to maximize gripping torque applied to the proximal pitch joint 42B. Opening of the proximal pitch joint 42B is controlled by tendon 90E, which is routed to oppose the other four tendons 90A-90D on the opposite side of axis A2.

Figure 12:
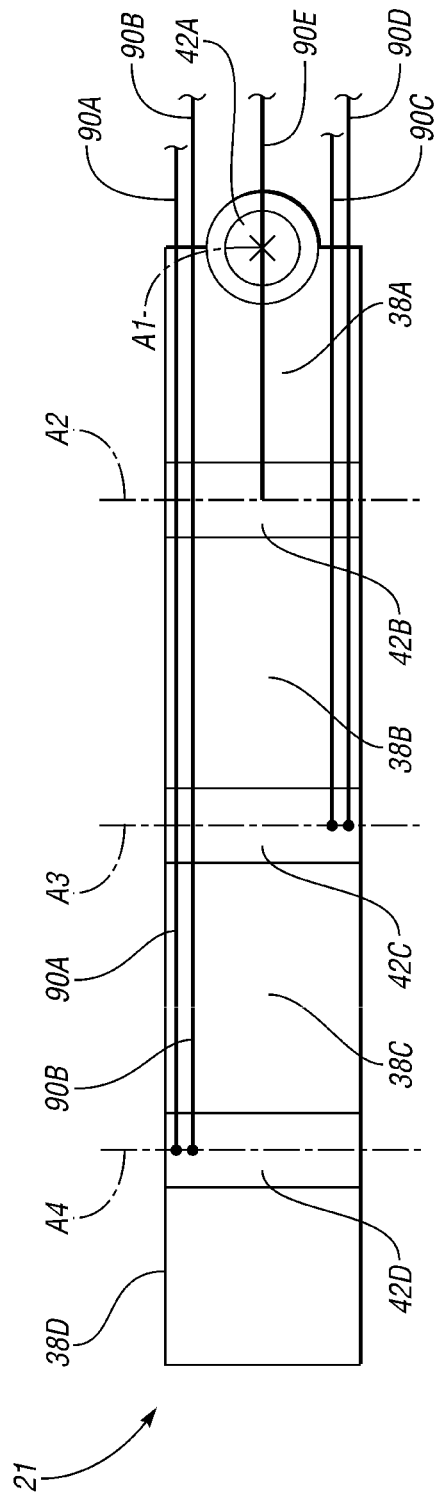
FIG. 12 is a schematic, top view of the thumb of FIGS. 6-8 depicting tendon routing.

Referring to FIG. 12, wherein like reference numbers refer to like components from FIGS. 1-11, there are no tendons dedicated to controlling the position of the base roll joint 42A. Instead, four of the five tendons 90A-90D are routed on opposite sides of axis A1 of the base roll joint 42A, and the balance of tension in these four tendons 90A-90D is manipulated to control the position of joint 42A and, correspondingly, the angular position of phalange 38A with respect to the base structure 34. More specifically, tendons 90A and 90B are routed on one side of joint 42A and axis A1, and tendons 90C and 90D are routed on another side of joint 42A and axis A1. The balance of tensions between tendons 90A and 90B, and tendons 90C and 90D controls the angular position of phalange 38A with respect to the base member (shown at 34 in FIGS. 4-5).

Given the tendon routing shown in FIGS. 11 and 12, it is possible to show how the four joint torques are independently controllable, as is the overall internal tension. Assuming that all of the moment arms are equal, then $$T_1 = A - B + C + D;$$

$$T_2 = A + B + C + D - E;$$

$$T_3 = A - B + C - D; \text{ and}$$

$$T_4 = A - B,$$

wherein A is the tension in tendon 90A, B is the tension in tendon 90B, C is the tension in tendon 90C, D is the tension in tendon 90D, E is the tension in tendon 90E, $T_1$ is the torque at joint 42A, $T_2$ is the torque at joint 42B, $T_3$ is the torque at joint 42C, and $T_4$ is the torque at joint 42D. To get a commanded set of joint torques, the following equations apply:

$$A = -T_1/4 + T_2/5 + T_4/2 + t/4;$$

$$B = -T_1/4 + T_2/5 - T_4/2 + t/4;$$

$$C = T_1/4 + T_2/5 + T_3/2 - T_4/2 + t/4;$$

$$D = T_1/4 + T_2/5 - T_3/2 - T_4/2 + t/4; \text{ and}$$

$$E = -T_2/5 + t,$$

where t is an internal tensioning factor that is large enough to keep all tensions positive. Those skilled in the art will recognize how to modify these equations if the moment arms are not equal or if they change with the angle of rotation of the joints.

It should be noted that, although the tendons 90A-E are depicted in FIGS. 11 and 12 as being external to the phalanges 38A-38D, each of the tendons is routed through a respective internal guide channel formed in the phalanges 38A-38D. Portions of the internal guide channels in phalange 38B are shown at 102A-102E in FIG. 7. Referring to FIGS. 7 and 11-12, tendon 90A is routed through guide channel 102A; tendon 90B is routed through guide channel 102B; tendon 90C is routed through guide channel 102C; tendon 90D is routed through guide channel 102D; and tendon 90E is routed through guide channel 102E. The angular twist in the shape of phalange 38B results in curved guide channels 102A-102D; exemplary methods of forming the guide channels 102A-102D include casting and Direct Metal Laser Sintering (DMLS).

It should also be noted that, although axis A2 appears to be parallel to axes A3 and A4 in FIGS. 11 and 12, axis A2 is twisted relative to axes A3 and A4 as shown in FIGS. 4 and 5.

In the embodiment depicted, the range of motion of joint 42A (base roll) is 0° to 80°; the range of motion of joint 42B (proximal pitch) is 0° to 100°; the range of motion of joint 42C (medial pitch) is 0° to 80°; and the range of motion of joint 42D (distal pitch) is −30° to 90°.

While the best modes for carrying out the invention have been described in detail, those familiar with the art to which this invention relates will recognize various alternative designs and embodiments for practicing the invention within the scope of the appended claims.

The invention claimed is:

1. A robotic hand assembly comprising:
 a base structure;
 first, second, third, and fourth phalanges;
 a first joint operatively connecting the first phalange to the base structure such that the first phalange is selectively rotatable with respect to the base structure about a first axis;
 a second joint operatively connecting the second phalange to the first phalange such that the second phalange is selectively rotatable with respect to the first phalange about a second axis;
 a third joint operatively connecting the third phalange to the second phalange such that the third phalange is selectively rotatable with respect to the second phalange about a third axis; and
 a fourth joint operatively connecting the fourth phalange to the third phalange such that the fourth phalange is selectively rotatable with respect to the third phalange about a fourth axis;
 five tendons that are operatively connected to the phalanges to selectively exert force thereon and thereby generate torque at the joints; said tendons being configured such that the torque at each of the joints is independently controllable by the five tendons.

2. The robotic hand assembly of claim 1, wherein the five tendons include first, second, third, fourth, and fifth tendons;
 wherein the first tendon is operatively connected to the fourth phalange such that tension in the first tendon urges the fourth phalange to rotate about the fourth axis in a first direction;
 wherein the second tendon is operatively connected to the fourth phalange such that tension in the second tendon urges the fourth phalange to rotate about the fourth axis in a second direction;
 wherein the third tendon is operatively connected to the third phalange such that tension in the third tendon urges the third phalange to rotate about the third axis in the first direction;
 wherein the fourth tendon is operatively connected to the third phalange such that tension in the fourth tendon urges the third phalange to rotate about the third axis in the second direction;
 wherein the fifth tendon is operatively connected to the second phalange such that tension in the fifth tendon urges the second phalange to rotate about the second axis.

3. The robotic hand assembly of claim 2, wherein the first, second, third, and fourth tendons are routed on a first side of axis A2.

4. The robotic hand assembly of claim 3, wherein the fifth tendon is routed on a second side of axis A2 opposite the first side of axis A2.

5. The robotic hand assembly of claim 2, wherein the first and second tendons are routed on a first side of the first axis; and wherein the second and third tendons are routed on a second side of the first axis opposite the first side of the first axis.

6. The robotic hand assembly of claim 5, wherein the fifth tendon intersects the first axis.

7. A robotic hand assembly comprising:
 a robotic thumb including a first phalange and a second phalange;
 a joint interconnecting the first phalange and the second phalange such that the first phalange is selectively rotatable with respect to the second phalange;
 a magnet being mounted with respect to the first phalange and having a first portion forming a first circle segment characterized by a first center point, and having a second portion forming a second circle segment characterized by a second center point; and a Hall effect sensor mounted with respect to the second phalange for rotation therewith respect to the first phalange.

8. The robotic hand assembly of claim 7, wherein the Hall effect sensor and the magnet are disposed such that the Hall effect sensor maintains a constant distance from the first portion over a range of rotation of the second phalange.

9. The robotic hand assembly of claim 8, wherein the range of rotation is at least 150 degrees.

10. The robotic hand assembly of claim 7, wherein the magnet circumscribes the first and second center points.

11. The robotic hand assembly of claim 7, wherein the first circle segment intersects the second circle segment at first and second intersection points;

wherein the north pole of the magnet is at the first intersection point; and wherein the south pole of the magnet is at the second intersection point.

12. The robotic hand assembly of claim 11, wherein the radius of the first circle segment is equal to the radius of the second circle segment.

13. A robotic hand assembly comprising:

a base structure;

a thumb having first, second, third, and fourth phalanges;

a first joint operatively connecting the first phalange to the base structure such that the first phalange is selectively rotatable with respect to the base structure about a first axis;

a second joint operatively connecting the second phalange to the first phalange such that the second phalange is selectively rotatable with respect to the first phalange about a second axis;

a third joint operatively connecting the third phalange to the second phalange such that the third phalange is selectively rotatable with respect to the second phalange about a third axis; and a fourth joint operatively connecting the fourth phalange to the third phalange such that the fourth phalange is selectively rotatable with respect to the third phalange about a fourth axis;

wherein the third and fourth axes are substantially parallel to one another; and wherein the second phalange is characterized by a twist such that the second axis is not parallel to the third and fourth axes.

14. The robotic hand assembly of claim 13, wherein the second phalange defines a plurality of curved guide channels.

15. The robotic hand assembly of claim 14, further comprising a plurality of flexible members; each of said flexible members extending through a respective one of said curved guide channels.

16. The robotic hand assembly of claim 15, wherein said plurality of flexible members includes a first flexible member operatively connected to the third phalange such that tension on the first flexible member urges the third phalange to rotate about the third axis; and wherein said plurality of flexible members includes a second flexible member operatively connected to the fourth phalange such that tension on the second flexible member urges the fourth phalange to rotate about the fourth axis.

* * * * *